United States Patent Office 3,501,433
Patented Mar. 17, 1970

3,501,433
POLYVINYL CHLORIDE COMPOSITIONS CONTAINING A RUBBER POLYESTER PLASTICIZER AND VINYL CHLORIDE-VINYL ACETATE COPOLYMER
Albert C. Condo, Jr., Newtown Square, Pa., assignor to Atlantic Richfield Company, Philadelphia, Pa., a corporation of Pennsylvania
No Drawing. Filed Mar. 11, 1968, Ser. No. 711,893
Int. Cl. C08f 45/38; C08k 1/38
U.S. Cl. 260—31.6                                    10 Claims

ABSTRACT OF THE DISCLOSURE

This invention relates to polyvinyl chloride compositions containing an acrylonitrile-butadiene rubber having about 20 weight percent bound acrylonitrile, a liquid polyester plasticizer of adipic acid and 1,3-butylene glycol and a vinyl chloride-vinyl acetate copolymer having a bound vinyl acetate content ranging from 5 to 20 weight percent. These polyvinyl chloride compositions have a unique combination of outstanding low temperature properties coupled with high oil extraction resistance.

---

In United States application Ser. No. 473,182 filed July 19, 1965, now Patent Ser. No. 3,419,511, hereby incorporated by reference into this specification there is described a polyvinyl chloride composition containing an acrylonitrile-butadiene rubber and polyester plasticizer which has outstanding low temperature properties and high oil extraction resistance. As pointed out in that specification, this combination of properties is unexpected since it is well-known that polymeric plasticizers such as polyesters do not impart good low temperature properties to the compositions. It was found, however, that a specific combination of a particular polyester plasticizer produced by the reaction of adipic acid with 1,3-butylene glycol and a particular acrylonitrile-butadiene rubber imparted to the composition outstanding low temperature and oil resistance properties. It has now been discovered that these properties can be further enhanced by incorporating into this composition small amounts of a vinyl chloride-vinyl acetate copolymer having a bound vinyl acetate content ranging from 5 to 20 weight percent. The incorporation of this copolymer provides even greater oil extraction resistance to the composition and consequently it has better low temperature flexibility after long periods of exposure to an oil environment.

The compositions of this invention are particularly useful for the preparation of oil packages such as those disclosed in a co-pending United States patent application Ser. No. 472,774, filed July 19, 1965, now Patent Ser. No. 3,381,441.

Briefly stated the compositions of my invention comprises in parts by weight
(a) 100 parts of polyvinyl chloride
(b) From about 20 to about 50 parts of an acrylonitrile-butadiene rubber containing about 20 weight percent of acrylonitrile
(c) From about 30 to about 60 parts of a liquid polyester of adipic acid and 1,3-butylene glycol having an average molecular weight of at least 1000; the sum of the parts of (b) and (c) ranging from about 56 to about 80 and (d) From about 1 to about 10 parts of vinyl chloride-vinyl acetate copolymer having a bound vinyl acetate content ranging from 5 to 20 weight percent.

It has been found that the desired properties are obtained only when the particular rubber, polyester and copolymer are employed with polyvinyl chloride in the proportions specified. In this connection as shown in Example IV of Ser. No. 473,182 the use of rubbers other than an acrylonitrile-butadiene rubber having an acrylonitrile content substantially below or above about 20 weight percent is unsatisfactory in the production of the compositions of this invention. Furthermore, polyesters produced from other glycols or other acids are unsatisfactory in the compositions.

The vinyl chloride-vinyl acetate copolymers which can be utilized in the practice of this invention contain from about 5 to about 20 percent by weight bound vinyl acetate. Most preferably, the amount of bound vinyl acetate ranges from 10 to 15 weight percent. These copolymers are prepared by the suspension, emulsion or solution polymerization of vinyl chloride and vinyl acetate monomers in the proper proportions. They are solid copolymers having molecular weights generally ranging from 25,000 to 150,000. The copolymers are utilized in the compositions of this invention in amounts ranging from 1 to 10 parts per 100 parts by weight polyvinyl chloride homopolymer. Preferably, they are utilized in amounts ranging from 2 to 5 parts per 100 parts by weight polyvinyl chloride homopolymer.

In general, any of the commercially available film forming polyvinyl chloride resins can be employed in the practice of this invention. These resins are solid homopolymers having molecular weights generally in the range of 50,000 to 150,000. They are produced by the suspension, emulsion or bulk polymerization of vinyl chloride.

The type of rubber employed is critical and must be an acrylonitrile-butadiene rubber containing about 20 percent by weight of acrylonitrile in order to obtain homogeneous compositions having brittleness temperatures of −30° F. and below. Although the initial Mooney viscosity (ML No. 4 at 212° F.) of the specific acrylonitrile-butadiene rubber used in the practice of the invention can vary throughout a wide range, acrylonitrile-butadiene rubbers having initial Mooney viscosities of from about 20 to 100, and preferably from about 40 to about 80 are more easily blended with the polyvinyl chloride resin during the compounding operation. The amount of acrylonitrile-butadiene rubber used to provide the composition of the invention is also critical. The compositions require from about 20 to about 50 parts by weight rubber per 100 parts by weight polyvinyl chloride homopolymer. Compositions containing less than about 20 parts of rubber per 100 parts of polyvinyl chloride homopolymer exhibit poorer flexibility at low temperatures, whereas compositions containing more than about 50 parts of rubber per 100 parts of polyvinyl chloride are not readily fabricated into film and sheet form.

The plasticizer used in the practice of the invention must be the condensation product of adipic acid and 1,3-butylene glycol. This polyester must be a liquid at room temperature, and have an average molecular weight of at least about 1000 and preferably about 3500. Preferably, the polyester is a chain terminated with an aliphatic monobasic acid of the formula $CH_3(CH_2)_nCOOH$ wherein $n$ is an integer from 10 to 16 inclusive. Examples of such acids are lauric, tridecanoic, myristic, pentadecanoic, palmitic, margaric and stearic acids. The most preferred polyester is one formed by the condensation of adipic acid and 1,3-butylene glycol having a molecular weight of approximately 3500 and terminated with palmitic acid. This polyester may be represented as follows:

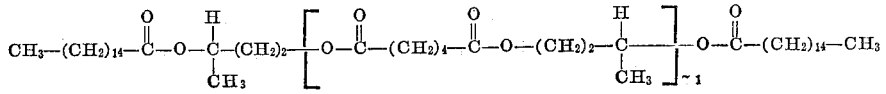

The polyesters of this invention may be prepared by condensing 1,3-butylene glycol and adipic acid in the presence of zinc chloride at elevated temperatures in the absence of air. A suitable method is set forth in the article of Kiroly and Beavers, "Journal of Industrial and Engineering Chemistry," Vol. 45, pages 1060 to 1063 (1953), which is hereby incorporated by reference as part of this specification.

The amount of polyester plasticizer employed is critical to the successful practice of the invention. In this connection, from 30 to 60 parts by weight of polyester per 100 parts of polyvinyl chloride homopolymer must be employed to attain brittleness temperatures of −30° F. and below.

The sum of the parts of acrylonitrile-butadiene rubber and the aforesaid polyester in the compositions of the invention must range from about 56 to about 80, based upon 100 parts of polyvinyl chloride homopolymer. Total loadings of polyester and rubber exceeding 80 parts by weight per 100 parts of polyvinyl chloride homopolymer cannot be readily processed into film and sheet form, whereas compositions containing a total loading of polyester and rubber of less than 56 parts do not provide films and sheets exhibiting brittle temperatures of −30° F. and below. In general, the use of approximately 25 parts by weight of the acrylonitrile-butadiene rubber and about 40 parts by weight of the aforesaid polyester per 100 parts of polyvinyl chloride homopolymer results in a composition which may be used for films having a particularly outstanding combination of properties.

In accordance with the invention the addition of the acrylonitrile-butadiene rubber, polyester and copolymer to the polyvinyl chloride can be accomplished in any manner so long as a thorough distribution of the additives in the polyvinyl chloride is obtained. For example, the mixing of the materials can be accomplished by any one of the variety of methods normally employed for the incorporation of plasticizers or fillers into thermoplastic polymers, including, but not limited to mixing rolls, doughmixers, Banbury mixers, blenders and other mixing equipment. The resulting mixtures can be handled in any conventional manner employed for the fabrication or manipulation of thermoplastic resins. The materials may be formed or molded using compression, injection, calendering and extrusion techniques. It should be understood that the polyvinyl chloride resin mixtures prepared in accordance with this invention can also contain, in addition to the specific rubber, specific polyester and the copolymer defined above, other additives to lubricate, prevent degradation, or lend color to the material. Common examples of these additives include heat stabilizers, pigments, fillers, ultraviolet light stabilizers, impact improvers, secondary plasticizers, lubricants and antioxidants. These additives are well-known in the art, and can be incorporated without departing from the scope of the invention.

The compositions of this invention are particularly suitable in providing sheets or films, as for example, by extrusion, or by calendering, which are characterized by good flexibility, and consequently good impact resistance at temperatures of the order of −30° F. and below, as well as a high degree of plasticizer extraction resistance when used in plasticizer solvent environments. Additionally, films or sheets produced from the compositions of the invention are characterized by good weldability, good heat stability and good sunlight resistance.

In order that those skilled in the art may better understand how the present invention may be practiced, the following examples are given by way of illustration and not by way of limitation. All parts and percents are by weight.

EXAMPLE I

The ingredients listed in Table I were combined in a Hobart mixer with 4.7 parts of a barium/cadmium heat stabilizer (a mixture of 3.1 parts Mark WS and 1.6 parts Mark C); 12.5 parts of titanium dioxide and 0.75 part of a lubricant (.038 part of stearic acid and .038 part of polyethylene-Epolene E–10). The stock was then milled at 300° F. until a homogeneous composition was obtained. The composition was withdrawn from the mill as a 10 mil film.

TABLE I

| | | |
|---|---|---|
| Polyvinyl chloride [1] | 100 | 100 |
| Plasticizer [2] | 45 | 45 |
| Rubber [3] | 25 | 25 |
| VC/VA copolymer [4] | 0 | 3.75 |
| Properties, brittleness test: [5] | | |
| Percent of specimens passing at— | | |
| −30° F | 100 | 100 |
| −40° F | 100 | 100 |
| −50° F | 50 | 100 |
| After complete immersion in 50° C. oil for 24 hours at −50° F | 0 | 60 |
| Abrasion resistance,[6] milligram loss/1,000 cycles | 82 | 35 |
| Oil extraction,[7] percent weight loss | 0.70 | 0.46 |

[1] Diamond 450—A polyvinyl chloride suspension grade homopolymer having specific viscosity (1% in cyclohexane at 30° C.) of 1.35.
[2] A condensation polymer of adipic acid and 1,3-butylene glycol terminated with palmitic acid; molecular weight ~3500; viscosity at 25° C., 50 poises; refractive index at 25° C., 1.466; saponification number, 500 mg. KOH/gram; specific gravity 1.08.
[3] Hycar 1024—An acrylonitrile-butadiene rubber having a bound acrylonitrile content of 20% with an average Mooney viscosity of 80 (ML-4/212° F.).
[4] Carbide VYHH—A suspension grade vinyl chloride-vinyl acetate copolymer having a bound vinyl acetate content of 15%; a specific gravity of 1.35 and a specific viscosity (1% in methyl isobutyl ketone at 30° C.) of 0.570.
[5] ASTM D-1790.
[6] Run on a Taber Abrasion Tester using a 1,000 gram load on a CS-17 wheel.
[7] Percent weight loss of a 10 mil sheet after immersion in mineral oil at 50° C. for 24 hours.

EXAMPLE II 192 quart oil packages were prepared utilizing the method disclosed in United States application Ser. No. 472,774 filed July 19, 1965. They were made using blown films prepared from the two compositions described in Example I. 24 packages of each film type were placed in each of 4 shipping containers. The shipping containers were then subjected to a transportation simulation test on a L.A.B., Inc. Transportation Simulator. The test was run at 1.25 gravity utilizing vertical motion for 4 hours. At the end of the test the cartons were inspected for leaking packages. The 4 cartons containing the packages made from regular film had a total of 8 leakers. The 4 cartons containing the packages prepared from the copolymer modified film did not have any leakers.

The importance of this test is apparent since the presence of even one leaker in a carton requires cleaning of the other 23 packages before they can be sold.

I claim:
1. A composition comprising in parts by weight
 (a) 100 parts of polyvinyl chloride
 (b) from about 20 to about 50 parts of an acrylonitrile-butadiene rubber containing about 20 weight percent of acrylonitrile
 (c) from about 30 to about 60 parts of a liquid polyester of adipic acid and 1,3-butylene glycol having an average molecular weight of at least 1000; the sum of the parts of (b) and (c) ranging from about 56 to about 80 and
 (d) from about 1 to about 10 parts of vinyl chloride- vinyl acetate copolymer having a bound vinyl acetate content ranging from 5 to 20 weight percent.

2. The composition of claim 1 wherein the concentration of copolymer ranges from 2 to 5 parts.

3. The composition of claim 1 wherein the bound vinyl acetate in the copolymer ranges from 10 to 15 weight percent.

4. The composition of claim 1 wherein the rubber content is about 25 parts and the polyester content is about 40 parts.

5. The composition of claim 1 wherein the polyester has an average molecular weight of about 3500.

6. The composition of claim 1 wherein the polyester is terminated with an acid of the formula $CH_3(CH_2)_n COOH$ where $n$ is an integer from 10 to 16 inclusive.

7. The composition of claim 6 wherein $n$ is 14.

8. A composition according to claim 1 comprising in parts by weight
  (a) 100 parts of polyvinyl chloride
  (b) about 25 parts of an acrylonitrile-butadiene rubber containing about 20 weight percent acrylonitrile
  (c) about 45 parts of a liquid polyester of adipic acid and 1,3-butylene glycol terminated with palmitic acid and having an average molecular weight of about 3500 and
  (d) about 4 parts of a vinyl chloride-vinyl acetate copolymer having a bound vinyl acetate content of about 15 weight percent.

9. A flexible sheet of the composition of claim 1.

10. A flexible sheet of the composition of claim 8.

References Cited

UNITED STATES PATENTS 3,419,511   12/1968   Condo et al. _____ 260—31.6 X

MORRIS LIEBMAN, Primary Examiner

L. T. JACOBS, Assistant Examiner

U.S. Cl. X.R.

260—891, 899